Nov. 25, 1930.  R. M. HARDGROVE  1,782,820
CEMENT SPREADER
Filed July 1, 1927   2 Sheets-Sheet 2
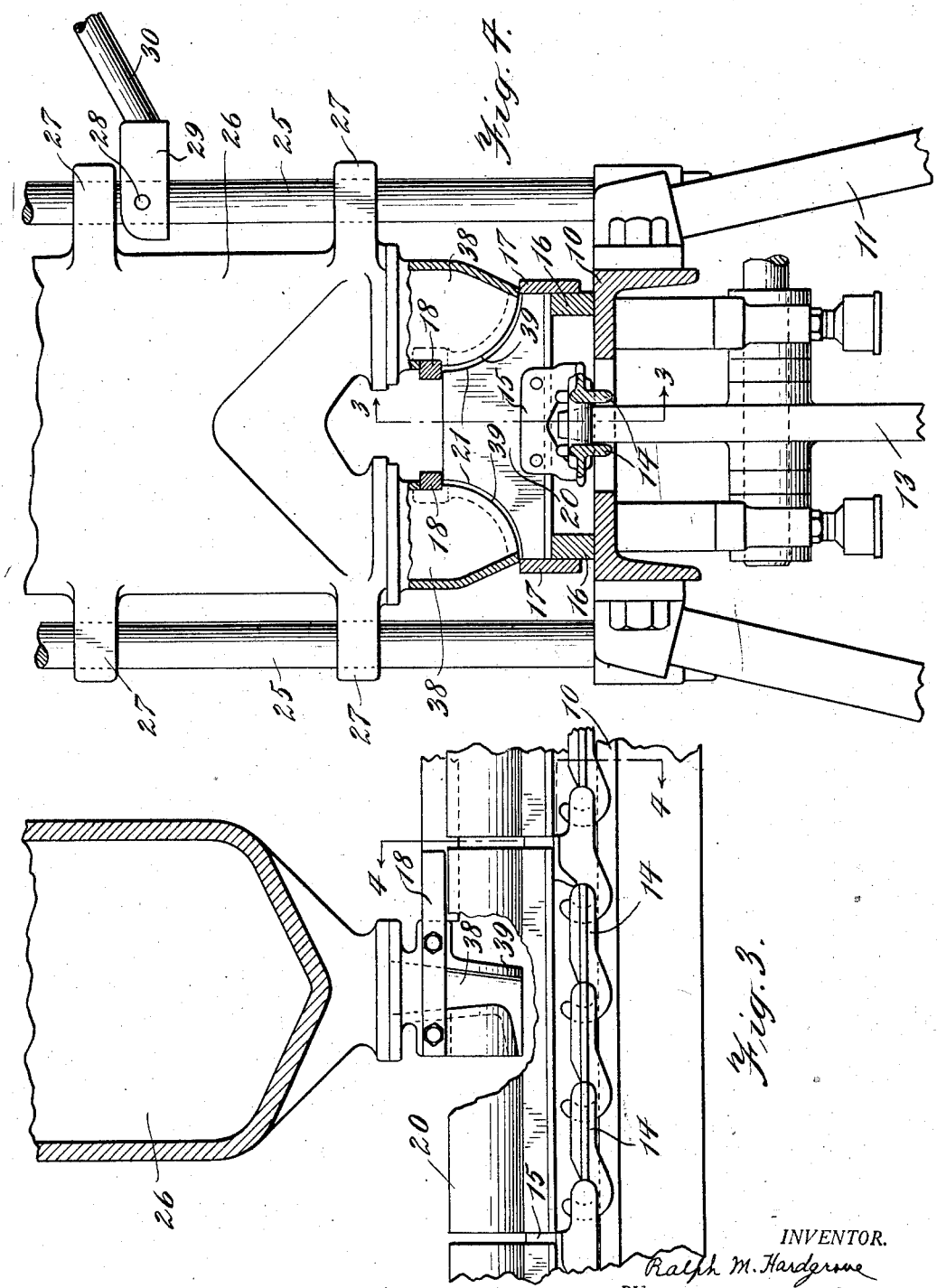
INVENTOR.
Ralph M. Hardgrove
BY
Gifford & Scull ATTORNEYS.

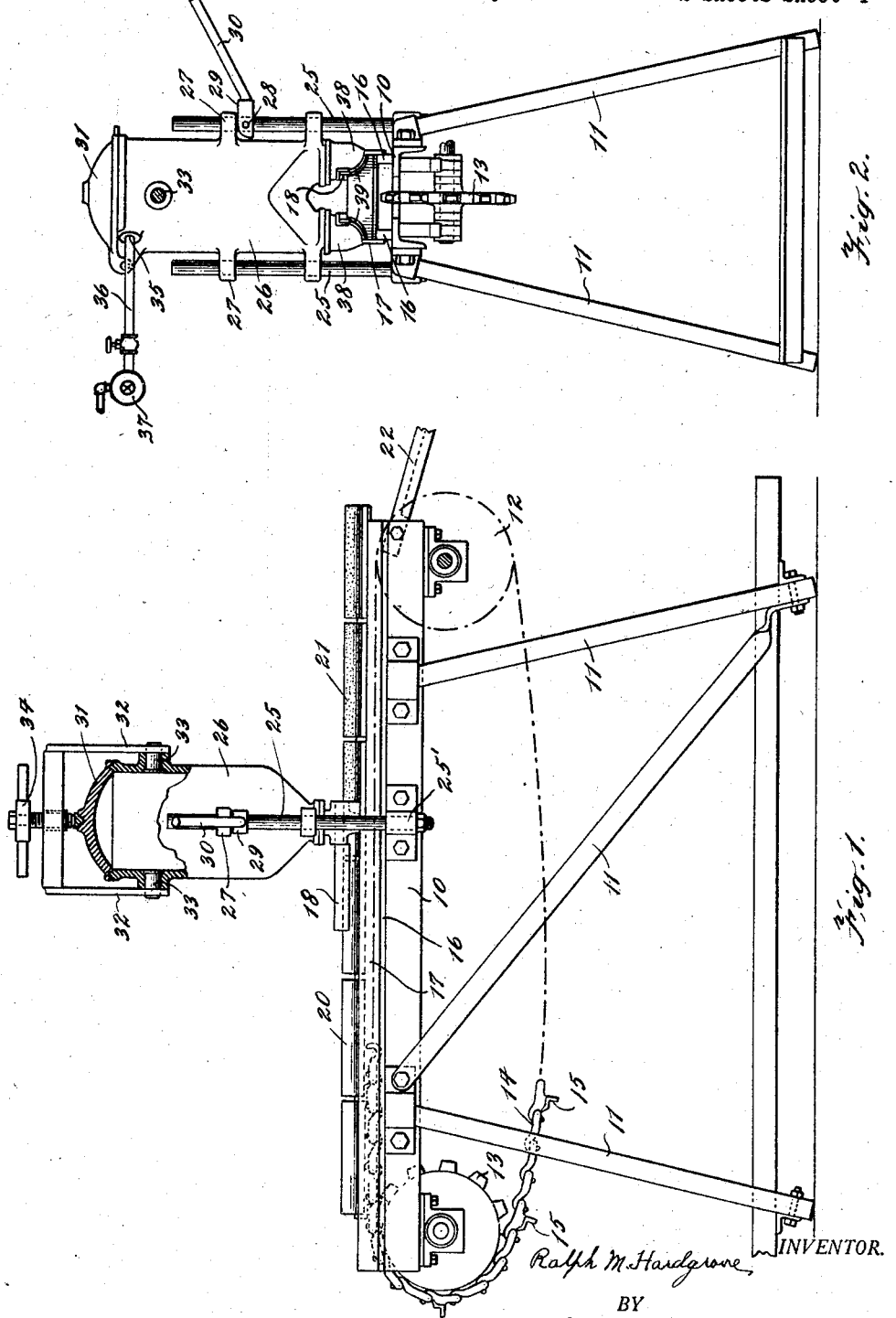

Patented Nov. 25, 1930

1,782,820

UNITED STATES PATENT OFFICE

RALPH M. HARDGROVE, OF ALLENTOWN, PENNSYLVANIA, ASSIGNOR TO FULLER LEHIGH COMPANY, OF FULLERTON, PENNSYLVANIA, A CORPORATION OF DELAWARE

CEMENT SPREADER

Application filed July 1, 1927. Serial No. 202,827.

This invention relates to a device for spreading plastic material upon surfaces. The invention will be described in connection with spreading plastic material of heat conducting nature upon tile or blocks that are to be used in connection with boiler furnaces that are provided with water wall tubes, but it is to be understood that the invention is not restricted to this particular use.

Boiler furnace walls are sometimes made with tubes located along the walls through which tubes water is caused to pass for the purpose of keeping the walls cool, and, at the same time, steam may be generated in the tubes and the tubes connected to the water circulatory system of the boiler. With such furnaces, blocks of metal are sometimes installed on the furnace side of the tubes and have rounded portions contacting with the tubes, thus providing extensive contact area between the blocks and the tubes. In order to procure more rapid transfer of heat from the blocks to the tubes, the portions of the blocks that contact with the tubes are coated with a composition of matter, such as finely divided carborundum, water glass and glycerine, for example, that is in a plastic condition. By the present invention, such cementitious or plastic material can be applied in a very rapid and satisfactory manner to the blocks.

In carrying out this invention, the material to be applied to the blocks is introduced into a container and forced out of properly shaped exits therefrom while the blocks to which the material is to be applied are passed transversely across the exits and the distance between the blocks and the ends of the exits is so regulated as to obtain the proper thickness of the plastic material upon the blocks.

The invention will be understood from the description in connection with the accompanying drawings, in which Fig. 1 is a side view of the device, partly broken away; Fig. 2 is an end view of the same; Fig. 3 is a section along the line 3—3 of Fig. 4, showing some of the details, and Fig. 4 is an end view, partly in section, along the line 4—4 of Fig. 3.

In the drawings, reference character 10 indicates a table that is provided with legs 11 for supporting the same. Sprockets 12 and 13 are mounted upon suitable bearings at the opposite ends of the table so that the sprockets 12 and 13 extend through openings in the table with the upper edges or teeth of the same slightly above the upper surface of the table 10. The sprocket 12 may be driven in any convenient manner (not shown), so that the sprocket chain 14 carried upon the sprocket wheel will be moved in a clockwise direction. The chain 14 carries pusher lugs 15 attached thereto at such intervals as will enable the objects to be coated to be inserted between the lugs 15.

Longitudinal parallel slides or supports 16 with smooth upper edges are mounted upon the upper surface of the table 10 along which the blocks are pushed as described below. Stationary guides 17 along opposite side edges of the blocks and stationary guides 18 along the top edges of the blocks are mounted so as to keep the blocks in place as they are pushed along the slides 16.

The blocks 20 having curved portions 21, to which curved portions the plastic material is to be applied, are pushed along the slides 16 by means of the lugs 15 and are guided by the guides 17 and 18. A slide or sloping platform 22 is provided at the end of the table upon which the blocks 20 are caused to slide after they have passed off of the slides 16.

Upright standards or supports 25, preferably in the form of rods, are connected to opposite sides of the table, as shown at 25', and a container or vessel 26 for the plastic material is provided with pairs of lugs 27 on opposite sides thereof having holes therethrough for the supports 25. A cross pin 28 is provided in one of the supports 25 and serves as a pivot for the bifurcated cam 29 that is provided with a handle 30. The pin 28 is so located that the cam 29 is positioned under one of the lugs 27 and limits the lowermost position of the container 26. A series of holes may be provided in the support 25 to permit the container 26 to descend to different distances in accordance with the position of the pivot pin 28.

The container 26 is provided with a pivoted cover 31 and a yoke 32 is provided on pivots 33 on opposite sides of the container 26. The yoke is provided with a hand screw 34 which contacts with the upper side of the cover 31 to press the same into firm engagement with the container 26. A gasket may be provided around the rim of the container so that the joint can be made air tight. An opening 35 is provided near the top of the container to which an air pressure pipe 36 may be connected from any convenient source of compressed air. A pressure reducing valve 37 is provided in the air supply pipe, which can be set for different pressures in accordance with the thickness or fluidity of the plastic material in the container 26.

Two outlets 38 are provided at the bottom of the container near the opposite edges of the table 10 and the lower end of each one terminates in an elongated curved mouth 39 of substantially the same shape as that of the curved surfaces of the blocks 20 to which the cement is to be applied. It is sometimes found advisable to apply the cement somewhat more thickly at one portion of the surface than at another, and this can be readily done by suitably shaping the ends of the mouths 39.

The operation is as follows: The sprocket chain 14 is driven to revolve in a clockwise direction as seen in Fig. 1, and the blocks 20 that are to have their curved surfaces coated with plastic material are placed in front of the lugs 15 as they pass around the sprocket 13, so that a continuous row of the blocks pass transversely of the open mouths 39. The weight of the material in the container 26 forces the same out of the mouths 39 and causes the same to be spread upon the curved faces 21 of the blocks 20 as they pass by the mouths and, in case the material it too stiff or thick to pass out of the mouths by its own weight, compressed air is introduced into the container through the pipe 36 and thereby forces the material out and upon the blocks 20. Only a slight amount of the plastic material passes into the spaces between the blocks 20 as they pass by the mouths, and this slight amount can be removed by hand as the blocks pass onto the sloping platform 22. The vertical position of the container 26 can be regulated to some extent by adjusting the cam 28, and the container 26 can be filled with charges of the material at intervals by removing the cover 31.

I claim:

1. A cement spreader for curved surfaces comprising a container for the cement having an exit the end of which is curved to correspond to the surface upon which the cement is to be spread, and means for moving an object having a curved surface across said exit.

2. A cement spreader for curved surfaces comprising a container for the cement having an exit the end of which is curved to correspond to the surface upon which the cement is to be spread, means for moving an object having a curved surface across said exit, and guides for said object.

3. A cement spreader for curved surfaces comprising a container for the cement having an exit the end of which is curved to correspond to the surface upon which the cement is to be spread, and means for moving an object having a curved surface across said exit, said means comprising a sprocket chain with lugs thereon.

4. In a device for spreading plastic material upon curved surfaces of objects, a container for said material having oppositely disposed curved exit openings, and means for passing the objects between said openings.

5. In a device for spreading plastic material upon curved surfaces of objects, a container for said material having oppositely disposed curved exit openings, and means for passing a series of objects in succession transversely between said openings in proximity thereto.

6. In a device for applying a layer of plastic material to objects, a horizontal guide for said objects having means to prevent lateral or vertical movement of said objects, a container for plastic material mounted in proximity to said guide, guides for said container to permit only vertical movement thereof, an exit opening from said container, a portion of which is substantially vertical and located below the tops of said objects as they pass along their guide, and means to cause said objects to pass transversely across said exit opening.

7. In a device for applying a layer of plastic material to objects, a horizontal guide for said objects having means to prevent lateral or vertical movement of said objects, a container for plastic material mounted in proximity to said guide, guides for said container to permit only vertical movement therefor, said container having exit openings facing each other, and means to pass objects along said guide between said openings.

8. A cement spreader for curved surfaces comprising a container for the cement having an axit, the end of which is curved to correspond to the surface upon which the cement is to be spread, and means for moving an object having a curved surface across said exit, a portion of which lies in a substantially vertical plane.

RALPH M. HARDGROVE.